United States Patent
Walls

(10) Patent No.: US 9,545,870 B2
(45) Date of Patent: Jan. 17, 2017

(54) MANUAL OVERRIDE FOR SLIDE-OUT ROOM SYSTEM HAVING WALL-MOUNTED DRIVE MECHANISM

(71) Applicant: LIPPERT COMPONENTS MANUFACTURING, INC., Elkhart, IN (US)

(72) Inventor: Lawrence E. Walls, South Bend, IN (US)

(73) Assignee: Lippert Components Manufacturing, Inc., Elkhart, IN (US)

( * ) Notice: Subject to any disclaimer, the term of this patent is extended or adjusted under 35 U.S.C. 154(b) by 207 days.

(21) Appl. No.: 14/452,225

(22) Filed: Aug. 5, 2014

(65) Prior Publication Data
US 2015/0040700 A1  Feb. 12, 2015

Related U.S. Application Data

(60) Provisional application No. 61/862,808, filed on Aug. 6, 2013.

(51) Int. Cl.
*B60P 3/34* (2006.01)
*F16H 19/04* (2006.01)

(52) U.S. Cl.
CPC .............. *B60P 3/34* (2013.01); *F16H 19/04* (2013.01); *Y10T 74/18808* (2015.01)

(58) Field of Classification Search
CPC ............................................. B60P 3/34
USPC .......... 296/26.12, 26.13, 165, 173, 175, 171
See application file for complete search history.

(56) References Cited

U.S. PATENT DOCUMENTS

| 5,865,499 | A | * | 2/1999 | Keyser | B60P 3/34 296/156 |
|---|---|---|---|---|---|
| 5,902,001 | A | * | 5/1999 | Schneider | B60P 3/34 296/26.13 |
| 6,422,628 | B1 | * | 7/2002 | Bortell | B60P 3/34 296/26.13 |
| 6,592,163 | B1 | | 7/2003 | Nebel | |
| 2002/0023393 | A1 | * | 2/2002 | McManus | B60P 3/34 296/26.13 |
| 2002/0047286 | A1 | | 4/2002 | Nye et al. | |
| 2005/0230989 | A1 | | 10/2005 | Nebel | |
| 2010/0219652 | A1 | * | 9/2010 | Reske | B60P 3/34 296/26.13 |

(Continued)

FOREIGN PATENT DOCUMENTS

WO    WO 98/33694    8/1998

OTHER PUBLICATIONS

International Search Report and Written Opinion issued in Int'l Pat. Appl. No. PCT/US2014/049798, dated Apr. 2, 2015.

*Primary Examiner* — Jason S Morrow
(74) *Attorney, Agent, or Firm* — Barnes & Thornburg LLP

(57) ABSTRACT

An apparatus for moving a slide-out room disposed in an aperture of a side wall of a vehicle from a retracted position to an extended position in a drive direction. The apparatus includes a drive assembly supported by the side wall of the vehicle and a driven assembly driven by the drive assembly. The driven assembly is connected to a wall of the slide-out room such that the slide-out room moves with the driven assembly from the retracted position to the extended position in the drive direction and the driven assembly is movable in a transverse direction generally perpendicular to the drive direction relative to the wall of the slide-out room.

17 Claims, 9 Drawing Sheets

(56) References Cited

U.S. PATENT DOCUMENTS

2013/0106131 A1    5/2013  Yoder et al.
2013/0119694 A1    5/2013  Garceau
2014/0138976 A1*   5/2014  Revelino .................. B60P 3/34
                                                    296/26.13

* cited by examiner

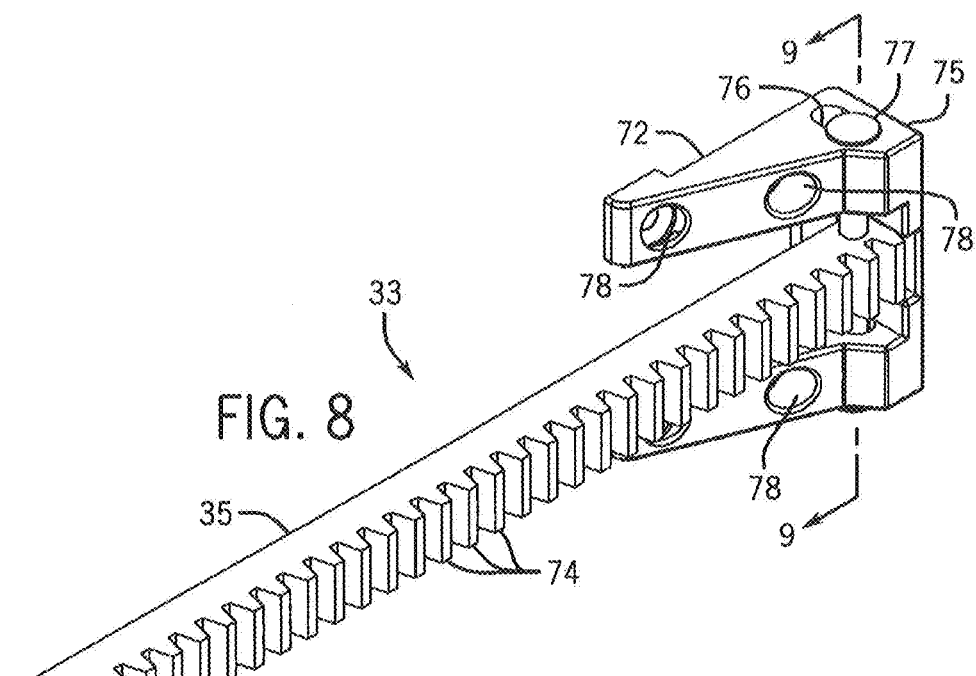
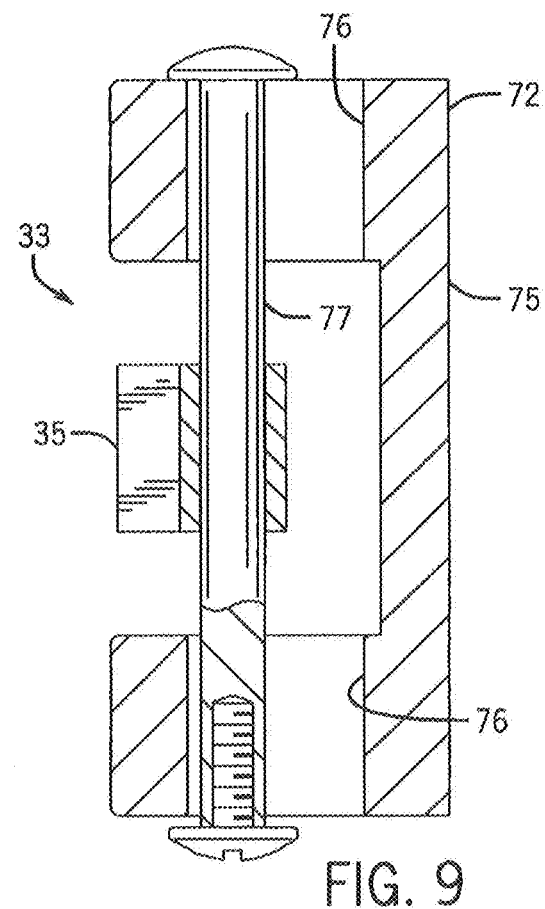

MANUAL OVERRIDE FOR SLIDE-OUT ROOM SYSTEM HAVING WALL-MOUNTED DRIVE MECHANISM

CROSS-REFERENCE TO RELATED APPLICATIONS

This application claims the benefit of U.S. Provisional Patent Application No. 61/862,808 filed Aug. 6, 2013, the disclosure of which is hereby incorporated by reference.

FIELD OF THE INVENTION

This disclosure generally relates to drive mechanisms for slide-out rooms of recreational vehicles and, more particularly, to manual overrides for such drive mechanisms.

BACKGROUND OF THE INVENTION

Some recreational vehicles include extendable slide-out rooms to increase the size of the living quarters while also providing an appropriate size for highway travel. Such slide-out rooms are driven by various types of mechanisms, such as hydraulic cylinders, drive screws, or rack-and-pinion gear drives. These mechanisms often are power-operated, for example, using electric motors. In the event such a motor or its power supply were to fail, it might be difficult or impossible to operate a conventional slide-out mechanism and, therefore, to deploy or retract the slide-out room.

SUMMARY OF THE DISCLOSURE

The present disclosure shows and describes one or more illustrative embodiments of a wall-mounted or in-wall drive system with a manual override. More particularly, the disclosure shows and describes an apparatus for moving a slide-out room in a side wall of a vehicle, the apparatus comprising a drive assembly that is supported by the side wall of the vehicle and that includes a motor, a driven assembly that is driven by the drive assembly and that is connected to a wall of the slide-out room, and a manual override allowing a user to move the slide-out room in the event of failure of the motor or its power supply.

BRIEF DESCRIPTION OF THE DRAWINGS

FIG. 5 is a detail side section view of the drive mechanism within line 5-5 of FIG. 4;

FIG. 8 is a detail perspective view of a driven assembly of the drive mechanism of FIG. 2;

FIG. 9 is a side section view of the drive assembly along line 9-9 of FIG. 8;

DETAILED DESCRIPTION OF THE DRAWINGS

Figure 1:
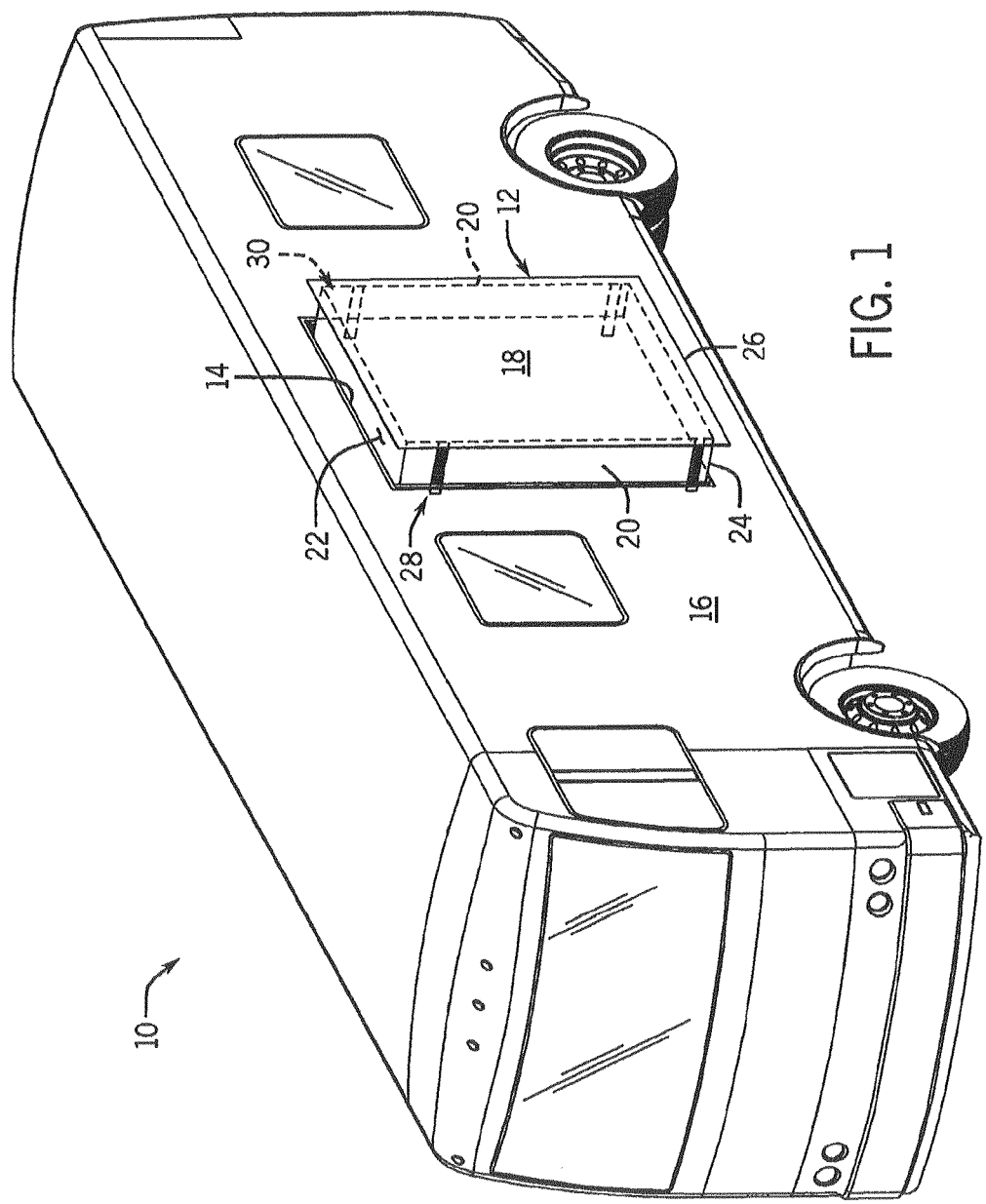
FIG. 1 is a perspective view of a recreational vehicle with an illustrative slide-out room system.
Figure 2:
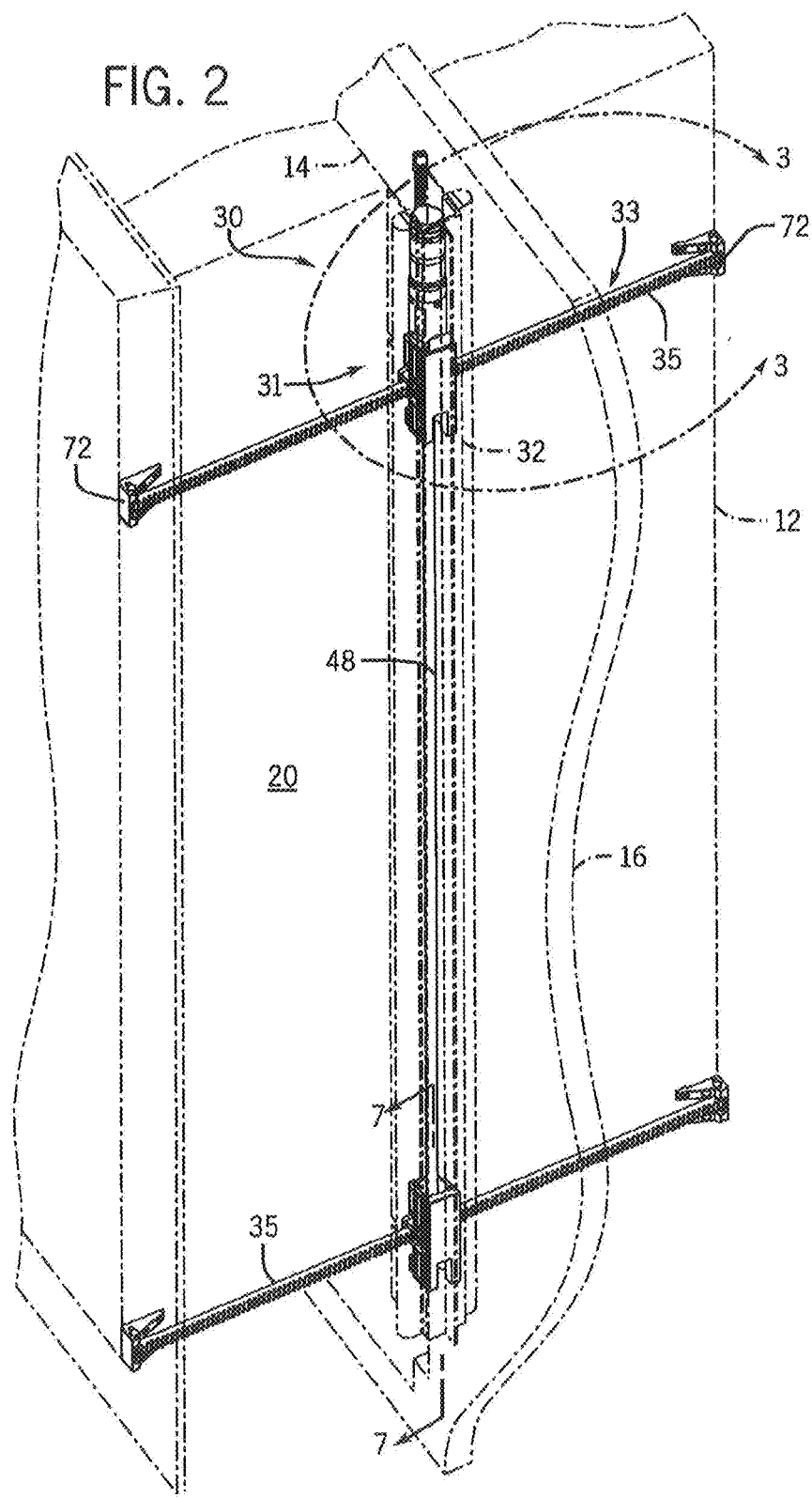
FIG. 2 is a detail perspective view of a drive mechanism of the slide-out room system of FIG. 1.

Referring first to FIGS. 1 and 2, a recreational vehicle 10 supports a slide-out room 12 in an aperture 14 of a vehicle side wall 16. An interior of the slide-out room 12 is defined by a leading or outside wall 18, side walls 20, a ceiling 22, and a floor 24. The leading wall 18 includes a fascia 26, and the plane of the fascia 26 is parallel to the respective planes of the aperture 14 and the side wall 16. The surface of the fascia 26 facing the side wall 16 includes a seal (not shown). The seal is compressed between the fascia 26 and the side wall 16 when the slide-out room 12 is retracted to prevent leaks between the cabin of the recreational vehicle 10 and the outside environment. The side walls 20 of the slide-out room 12 also include flanges (not shown) located inside the vehicle 10. The surface of the flanges facing the side wall 16 also includes a seal (not shown) to prevent leaks between the cabin of the recreational vehicle 10 and its environment when the slide-out room 12 is extended.

The slide-out room 12 is moved in a drive direction between the extended and retracted positions by two drive mechanisms 28 and 30 (FIG. 1), and one of the drive mechanisms 28 and 30 connects to each of the side walls 20. The drive mechanisms 28 and 30 are generally identical except for being disposed in mirrored relation to one another. As such, only the drive mechanism 30 will be described below for simplicity.

Referring to FIGS. 2-9, the slide-out room drive mechanism 30 generally includes a drive assembly or pinion assembly 31 that is partially disposed in a support channel 32 positioned in the aperture 14 of the vehicle side wall 16. The drive assembly 31 drives a driven assembly 33 (which generally includes a rack 35 as described in further detail below) connected to one of the side walls 20 of the slide-out room 12. As shown most clearly in FIG. 2, the drive mechanism 30 includes upper and lower sections that are disposed adjacent upper and lower sections of the slide-out room side wall 20, respectively.

Figure 3:
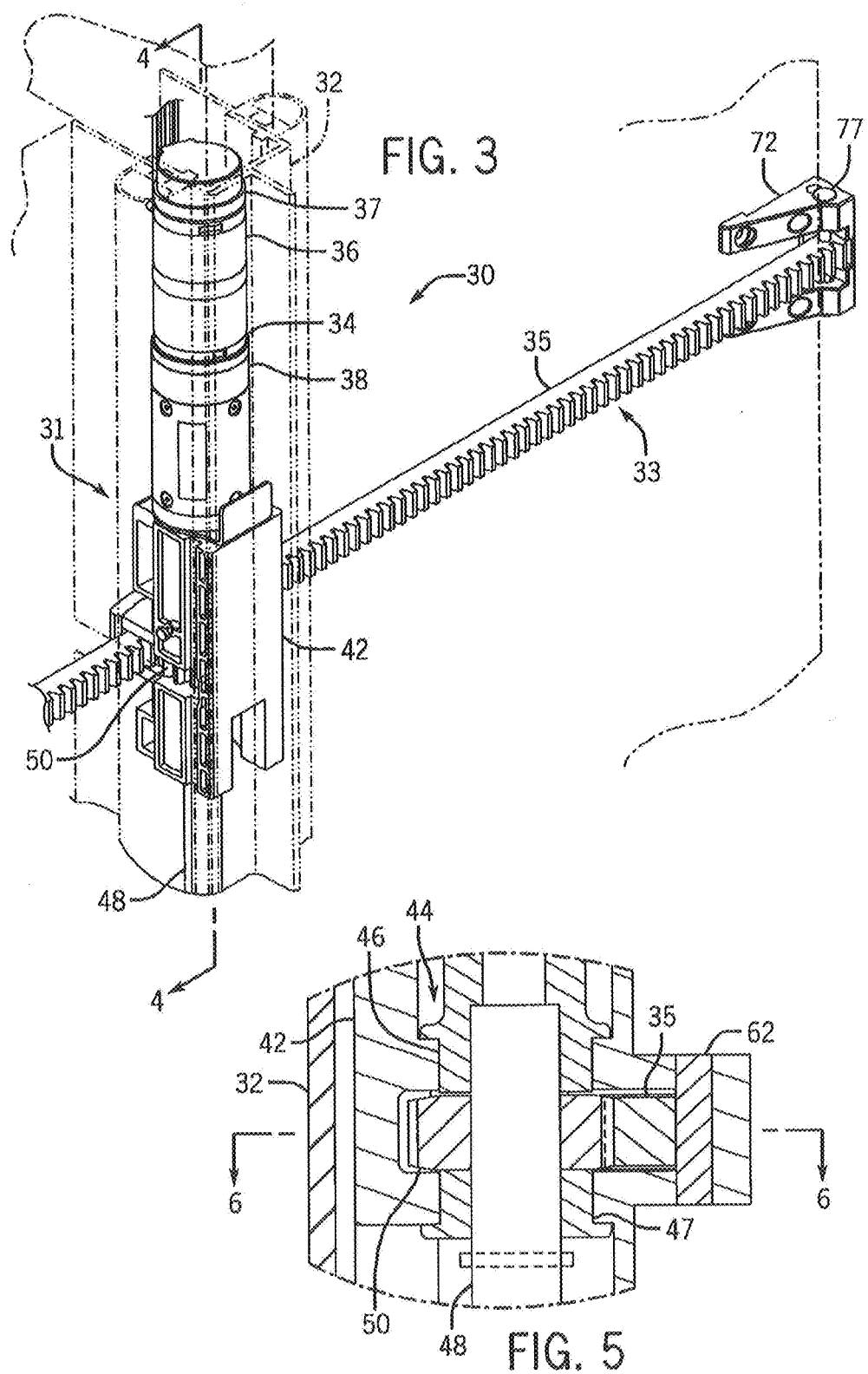
FIG. 3 is a detail perspective view of the drive mechanism within line 3-3 of FIG. 2.
Figure 4:
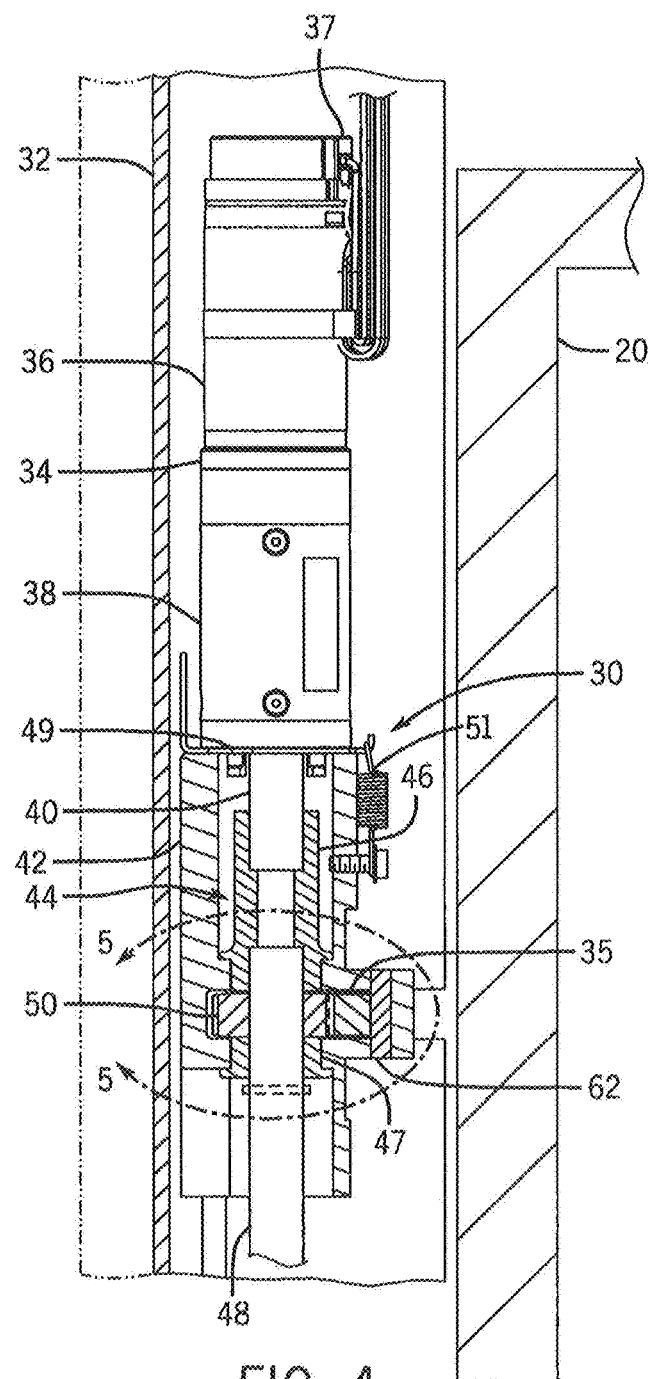
FIG. 4 is a side section view of an upper section of the drive mechanism along line 4-4 of FIG. 3.

Referring specifically to FIGS. 3-5 and turning first to the upper section, the drive mechanism 30 includes a prime mover 34 that receives power from a dedicated battery (not shown), the vehicle's alternator (not shown), or the like. The prime mover 34 may include a high-speed permanent magnet or brushless 12V DC motor 36 or the like. In some embodiments, the motor 36 includes a rotary encoder (e.g., a Hall effect rotary encoder) and/or dynamic brakes 37 that are operatively connected to the same electrical circuit as the motor 36. Such dynamic brakes 37 automatically engage when power to the motor 36 is interrupted.

Alternatively, the dynamic brakes 37 may be replaced by other types of brakes that are adapted to arrest movement of the drive mechanism 30. The brake 37 prevents the drive train from moving in the reverse direction and thus maintains the gasket seals in a compressed state in the retracted position and/or the extended position of the room 12. When in the retracted position, this also inhibits the room 12 from moving in the direction of vehicle travel due to inertia (e.g., when the vehicle 10 abruptly slows or stops) because of friction of the gasket seals in compression.

The prime mover 34 further includes a speed reducer 38, such as a planetary gear transmission, a spur gear transmission, or the like, driven by the motor 36 and having a rotatable output shaft 40 (FIG. 4). The speed reducer 38 significantly reduces the rotational speed provided by the motor 36 and significantly increases the torque. An appropriate torque may be determined based on the size and weight of the slide-out room 12. Appropriate prime movers 34 including the motor 36, the dynamic brakes 37, and the speed reducer 38 are available from Merkle-Korff Industries of Elk Grove Village, Ill. Other appropriate prime movers 34 are available from Rexnord Corporation of Milwaukee, Wis., Stature Electric, Inc. of Watertown, N.Y., and the like.

Figure 6:
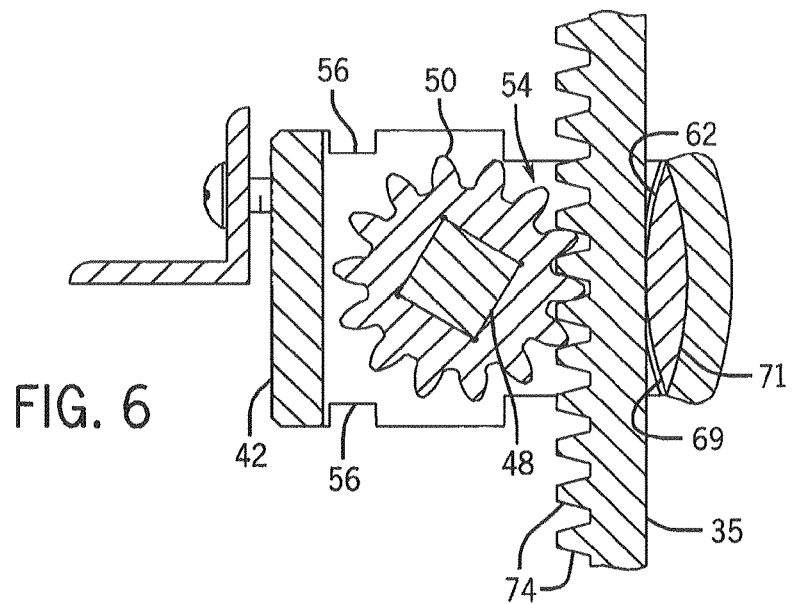
FIG. 6 is a top section view of the drive mechanism along line 6-6 of FIG. 5.
Figure 7:
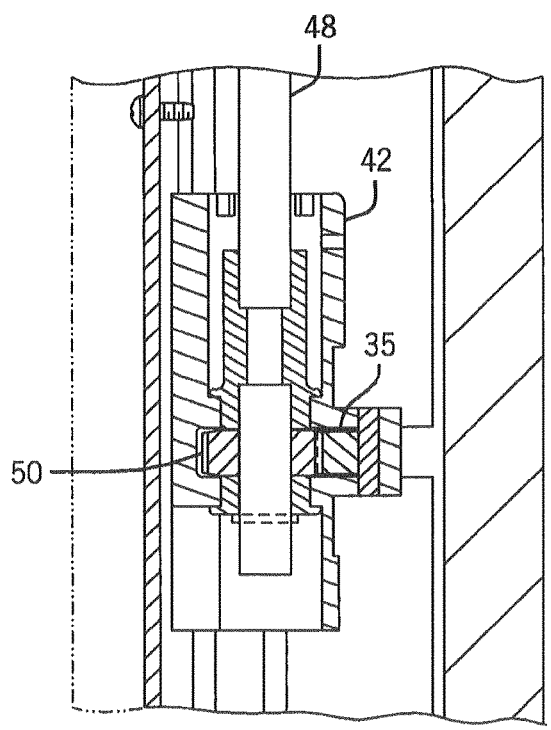
FIG. 7 is a side section view of a lower section of the drive mechanism of FIG. 2.

Turning to FIGS. 4-6, the motor 36 and the speed reducer 38 are supported by a drive support 42 disposed therebelow. The drive support 42 may comprise various materials, such as molded plastics, machined metal, or the like. Internally, the drive support 42 is hollow and defines a passageway 44 that receives a combined coupling/bushing 46 connecting the output shaft 40 to a drive shaft 48 (e.g., a square cross-sectional drive shaft). Within the passageway 44, the combined coupling/bushing 46 and a lower bushing 47 support the drive shaft 48. Vertically near the middle of the drive support 42, the passageway 44 is sized to receive a pinion gear 50 supported by the drive shaft 48. The passageway 44 also has an opening 54 (FIG. 6) to permit the pinion 50 to engage the driven assembly 33, specifically the rack 35, which will be described in further detail below.

Externally, the surfaces of the drive support 42 engage several components. For example, the drive support 42 includes an upper surface that abuts a mounting bracket 49 connected to the prime mover 34. The mounting bracket 49 is connected to the drive support 42 via an extension spring 51 fastened to the drive support 42.

In addition, the side surfaces of the drive support 42 are not fixedly connected to the support channel 32. Instead, the side surfaces of the drive support 42 include keyways 56 (FIG. 6) that extend in the longitudinal direction of the support channel 32 and receive keys (not shown) on the inner sides of the support channel 32. As shown in the figures, the keyways 56 have square cross-sectional shapes, although other shapes may be used provided that they permit the drive support 42 to "float" in the longitudinal direction of the support channel 32 (that is, to move in an "elevation" or vertical direction generally perpendicular to the drive direction). This ability to "float" permits the slide-out room 12 to act as a "flush floor" room in some embodiments and ensures the weight of the slide-out room 12 is supported by relatively strong components spaced apart from the drive mechanism 30. That is, rollers disposed on the underside of the room 12 support the weight of the slide-out room 12 whether it acts as a flush floor room or a non-flush floor room (i.e., a "flat floor" room; see FIG. 19 and the associated description). This aspect is described in further detail below.

The front face of the drive support 42 includes a mounting support 62 that is disposed proximate the opening 54 and between the pinion gear 50 and the slide-out room wall 20. The mounting support 62 also engages the rack 35 and is disposed between the rack 35 and the slide-out room wall 20. As such, the mounting support 62 inhibits the rack 35 from disengaging the pinion gear 50. Furthermore, the mounting support 62 may include front and rear convex surfaces 69 and 71 that generally face in a transverse direction (i.e., a direction generally perpendicular to both the drive direction and the elevation direction, or the direction of vehicle movement over the road). The convex surfaces 69 and 71 advantageously reduce friction forces between the mounting support 62 and the rack 35 and, similarly, permit the rack 35 to be skewed relative to the slide-out room side walls 20.

Referring specifically to FIGS. 3, 8, and 9, the driven assembly 33 includes the rack 35 and two room engaging brackets 72 secured to the side wall 20 and supporting opposite ends of the rack 35. The rack 35 is a generally elongated component in the drive direction and may comprise various materials, such as hobbed aluminum or the like. The rack 35 also includes a plurality of gear teeth 74 that engage teeth of the pinion gear 50 and permit the rack 35 to be driven by the pinion gear 50.

The room engaging brackets 72 each have a horseshoe-like shape as viewed in the transverse direction. A base 75 of each bracket 72 includes transversely-elongated slots 76 for receiving pins 77 extending in the elevation direction and connecting the rack 35 to the bracket 72. This "pin-in-slot" connection permits the rack 35 to move in the transverse direction as the slide-out room 12 moves in the drive direction.

Each bracket 72 also includes a plurality of through holes 78 for receiving fasteners (not shown) that connect the bracket 72 to the slide-out room wall 20.

Turning again to FIGS. 2 and 7, the drive shaft 48 extends below the drive support 42 to the lower section of the drive mechanism 30. In general, the lower section of the drive mechanism 30 is identical to the upper section below the prime mover 34. That is, the lower section of the drive mechanism 30 generally includes a drive support 42 that rotatably mounts a pinion gear 50 and holds a rack 35 in engagement with the pinion gear 50, and can slide up and down vertically in the channel 32.

From the above it should be apparent that both drive mechanisms 28 and 30 receive power to move the slide-out room 12 relative to the rest of the vehicle 10. In some embodiments, the prime movers 34 of the drive mechanisms 28 and 30 may be synchronized to ensure that the slide-out room side walls 20 move in an appropriate manner relative to one another. The prime movers 34 may be synchronized as described in U.S. patent application Ser. No. 13/197,291, U.S. Patent Publication No. 2009/0261610, U.S. Pat. No. 6,536,823, U.S. Pat. No. 6,345,854, U.S. Pat. No. 6,471,275, or U.S. Pat. No. 6,696,813, the disclosures of which are hereby incorporated by reference. The prime movers 34 may alternatively be synchronized in other manners not described explicitly herein. For example, the prime movers 34 may be mechanically synchronized (via a shaft and gears, a chain and sprockets, or the like, connecting the two drive mechanisms 28 and 30).

The drive mechanisms 28 and 30 may be operated by a single rocker switch (not shown). Along with synchronization as described above, sensors (not shown) mounted to the mechanisms 28 and 30 detect when the slide-out room 12 is extended to a first certain position. In that position, the horizontal prime movers 34 are de-energized and a vertical prime mover (e.g., 346; see below) is energized to raise or lower the room 12 to a second certain position. The sensors detect when the slide-out room 12 occupies the second certain position. In that position, the vertical prime mover is de-energized and the horizontal prime movers 34 are re-energized to move the room 12 horizontally. This results in a square "Z" type of movement.

The drive mechanisms 28 and 30 may also be controlled in an "automatic jog mode". That is, if the sensors detect no movement of one of the drive mechanisms 28 or 30 in one direction, the other mechanism 28 or 30 will also be de-energized. Subsequently, movement of the mechanisms 28 and 30 in the same direction is not allowed, and movement of the mechanisms 28 and 30 in the opposite direction is the only direction permitted. If the sensors detect no movement of the same drive mechanism 28 or 30 in the opposite direction, the other mechanism 28 or 30 will be de-energized and the system is put into an emergency retract mode or "automatic jog mode". In this mode, the system only permits a short time of movement in the direction of a button push. Instead, multiple button pushes are needed to fully retract or extend the room 12.

Figure 10:
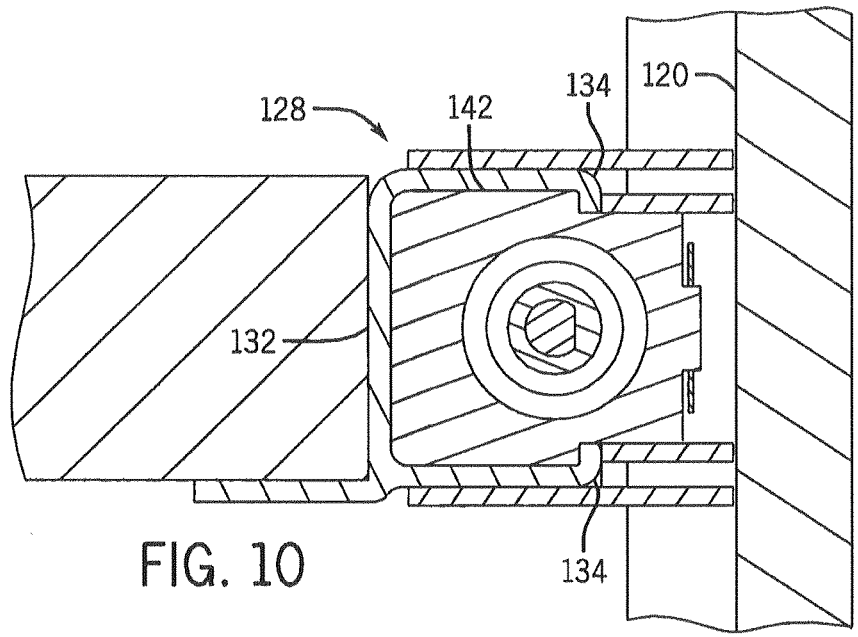
FIG. 10 is a top sectional view of a second embodiment of the drive mechanism illustrating an interface between a support channel and a drive support.

Turning now to FIG. 10, a second embodiment of the drive mechanism 130 is generally as described above. However, the support channel 132 includes one or more lips 134 that connect to an edge proximate the slide-out room side wall 120 and extend in the drive direction. The lips 134 also extend between the drive support 142 and the slide-out room side wall 120, or "wrap" around the drive support 142, to inhibit the drive support 142 from moving out of the channel 132 in the transverse direction. However, the lips 134 permit the drive support 142 to float in the elevation direction as described above.

Figure 11:
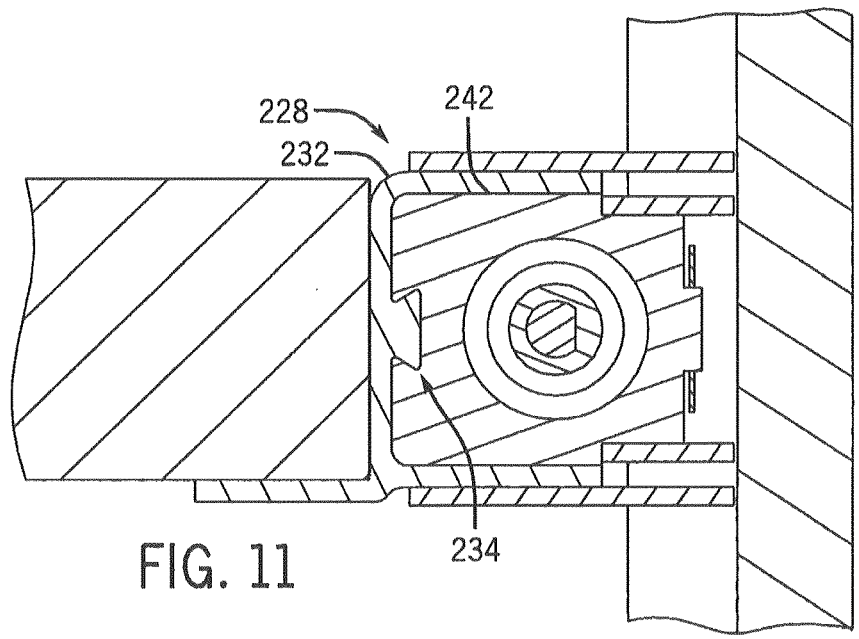
FIG. 11 is a top sectional view of a third embodiment of the drive mechanism illustrating an interface between the support channel and the drive support.

Referring to FIG. 11, a third embodiment of the drive mechanism 230 is also generally as described above. However, the support channel 232 and the drive support 242 include an interface 234 proximate the rear wall of the channel 232 to connect the two components. As shown in the figures, the interface 234 may have a dovetail shape. Other shapes may be used provided that they inhibit the drive support 242 from moving out of the channel 232 in the transverse direction and permit the drive support 242 to float in the elevation direction.

Figure 12:
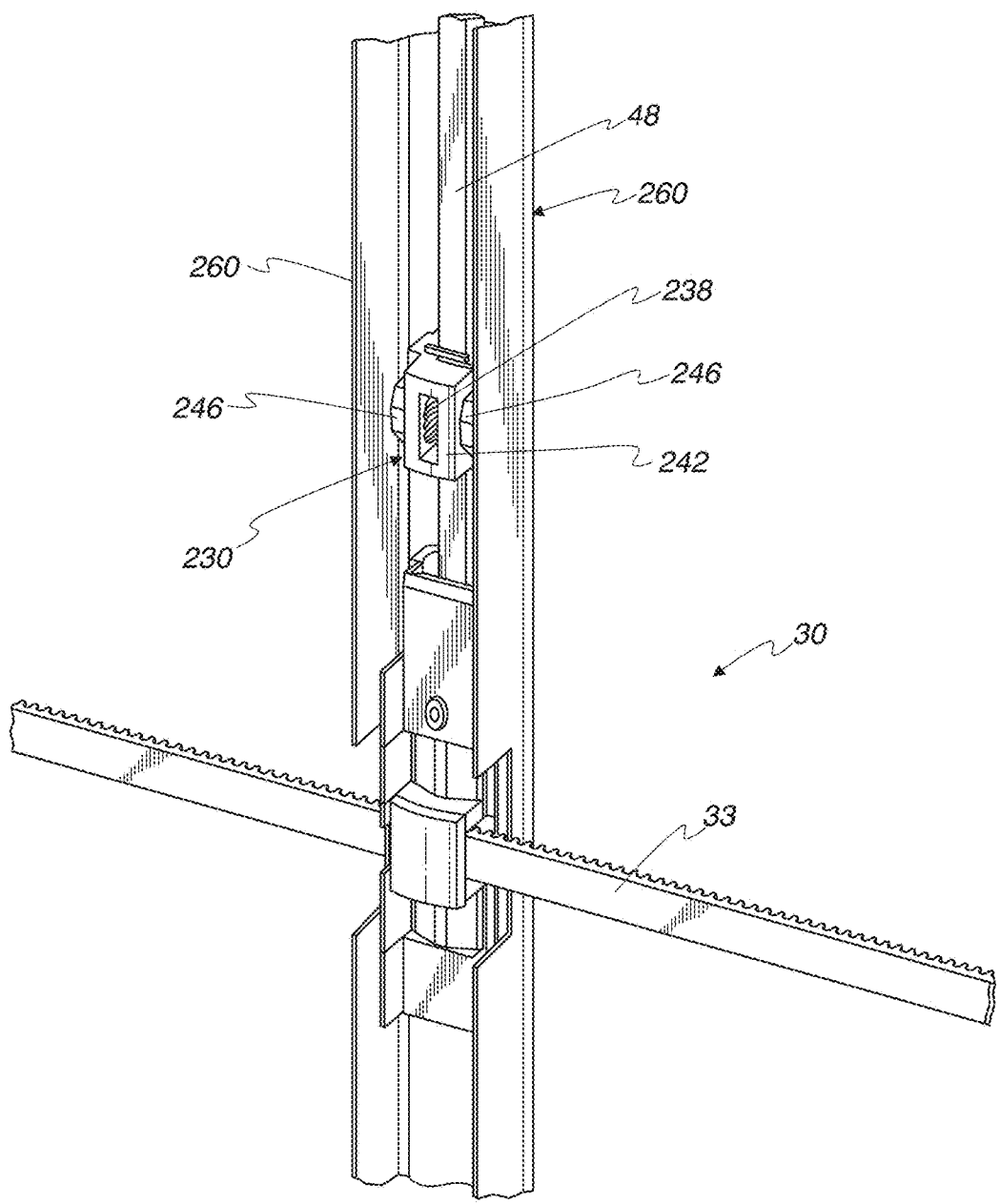
FIG. 12 is a perspective view of a portion of a drive system embodying a manual override.
Figure 13:
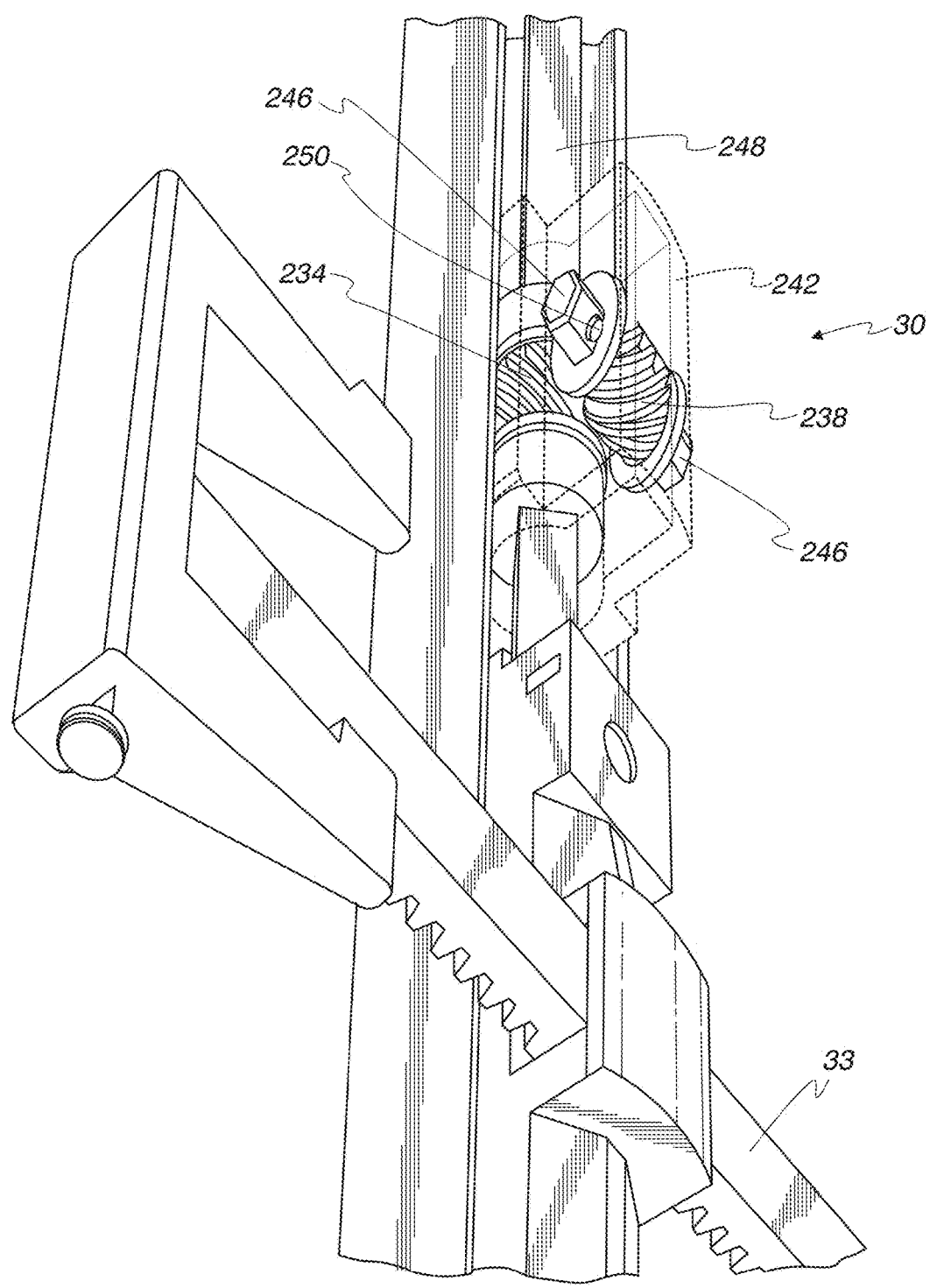
FIG. 13 is an enlarged perspective view of a portion of the drive system shown in FIG. 12.

A drive system 30 including a manual override is partially shown in FIGS. 12 and 13. The drive system 30 comprises a vertical drive shaft 48 that is square in cross-section and that is driven by a motor (not shown). A pinion gear (not shown) is fixed to the drive shaft 48 for rotation therewith. The pinion gear drivingly engages a horizontal rack 33 such that rotation of the drive shaft 48 in one direction moves the rack 33 horizontally in one direction, and rotation of the drive shaft 48 in the other direction moves the rack 33 horizontally in the other direction. The rack 33 is connected to a wall of a slide-out room (not shown) for extending and retracting the room from a side wall of a vehicle (not shown). The drive shaft 48 is part of a drive assembly, and the rack 33 is part of a driven assembly.

The drive system 30 also comprises a manual override 230 allowing a user to move the slide-out room in the event of failure of the motor or its power supply. The figures show a manual override 230 including a helical override driven gear 234 fixed or keyed to the drive shaft for rotation therewith. A second, mating helical override drive gear 238 meshes with the helical override driven gear 234 such that rotation of the override drive gear 238 causes rotation of the override driven gear 234 and thereby causes rotation of the drive shaft 48. The override drive gear 238 is supported by a housing 242 for rotation about a horizontal axis. The housing 242 is generally U-shaped and generally extends over the gear 234. The housing 242 may be supported by the support channel 32. The gear 238 has opposite ends spaced horizontally A hexagonal head 246 is fitted to each end of the gear 238 external to the housing 242, such that the hex heads 246 can be engaged by a wrench (not shown) to manually rotate the gear 238. The gear 238 can be, for example, splines or other fixed on a horizontal shaft (not shown) mounted on the housing 242, and the hex heads 246 can be fixed to the ends of the shaft by suitable means, for example, a set screw 250 or splines (not shown).

The override gears 234, 238 preferable have a 2:1 gear ratio (such that two rotations of override drive gear 238 yield one rotation of override driven gear 234), but other ratios can be employed. In an embodiment, a torque of about 25 foot-pounds applied to override drive gear 238 may be sufficient to move the slide-out room. The hex heads 246 may be sized to be received by a ½ inch socket. In other embodiments, hex heads 246 could have other sizes (both hex heads need not be the same size) or they could be replaced by heads of other shapes configured for operation with tools having complementary shapes.

The manual override could be operated by gaining access to one of the hex heads 246 from inside or outside or outside of the RV. This could be accomplished by pulling back a seal 260 that might otherwise block access to the hex heads 246, if necessary. A wrench or other suitable tool could be engaged with the hex head 246 and used to turn the hex head 246, thereby rotating the override drive gear 248. Rotation of the override drive gear 248 results in rotation of the override driven gear 234 and therefore, the shaft 48 to which the gear 234 is keyed. The rotating shaft 48 causes the slide-out room to extend or retract in the manner it would if it were being driven by the motor. Because of physical space constraints between the RV and the slide out room, it may be necessary or desirable in some instances to operate the manual override from inside the RV for a portion of the travel of the slide-out room and from the outside of the RV for another portion of the travel of the slide-out room. Also, it may be necessary or desirable in some instances to install a manual override on the wall mounted drive systems located on both sides of the slide-out room and to operate the slide-out manually on both sides of the slide-out room simultaneously or alternately on one side and then the other in step fashion in order to preclude or mitigate binding of the slide-out room within the opening in the side wall of the RV while manually operating the slide-out room.

The foregoing arrangement for manually rotating the override driven gear 234 is illustrative. Other arrangements could be employed to the same or a similar end.

The invention claimed is:

1. An apparatus for moving a slide-out room having a first and a second side opposite the first side, the slide-out room disposed in a side wall of a vehicle, the apparatus comprising:
   a first drive assembly that is supported by the side wall of the vehicle proximate the first side of the slide-out room and that includes a first motor;
   a first driven assembly that is driven by the first drive assembly and that is connected to a first wall of the slide-out room; and
   a first manual override allowing a user to operate the first drive assembly and thereby to move the slide-out room in the event of failure of the first motor;
   a second drive assembly that is supported by the side wall of the vehicle proximate the second side of the slide-out room and that includes a second motor;
   a second driven assembly that is driven by the second drive assembly and that is connected to a second wall of the slide-out room opposite the first wall of the slide-out room; and
   a second manual override allowing a user to operate the second drive assembly and thereby to move the slide-out room in the event of failure of the second motor;
   wherein the first manual override is located on the first side of the slide out room, the second manual override is located on the second side of the slide-out room, and the first and second manual overrides are independently operable.

2. The apparatus of claim 1, the first drive assembly comprising a first shaft and a first drive gear on the first shaft.

3. The apparatus of claim 2, the first manual override comprising a first override drive gear, a first override driven gear in mesh with the first override drive gear, and a first override drive head connected to the first override drive gear.

4. The apparatus of claim 3, the first override driven gear keyed to the first shaft of the first drive assembly.

5. The apparatus of claim 4 wherein the first override drive gear and the first override driven gear are helical gears.

6. The apparatus of claim 5 wherein the first override drive gear has an axis of rotation perpendicular to an axis of rotation of the first override driven gear.

7. The apparatus of claim 3 wherein the first override drive gear and the first override driven gear have a gear ratio of about 2:1.

8. The apparatus of claim 3 wherein the first override drive head is a hex head.

9. The apparatus of claim 3 wherein the first drive gear is a first pinion gear and the first driven assembly comprises a first rack in mesh with the first pinion gear.

10. The apparatus of claim 3 further comprising a first generally U-shaped housing supporting the first override drive gear.

11. The apparatus of claim 10, further comprising a first support channel, the first drive assembly partially disposed in the first support channel and the first housing supported by the first support channel.

12. The apparatus of claim 4, the second drive assembly comprising a second shaft and a second drive gear on the second shaft.

13. The apparatus of claim 12, the second manual override comprising a second override drive gear, a second override driven gear in mesh with the second override drive gear, and a second override drive head connected to the second override drive gear.

14. The apparatus of claim 13, the second override driven gear keyed to the second shaft of the second drive assembly.

15. The apparatus of claim 13 wherein the second drive gear is a second pinion gear and the second driven assembly comprises a second rack in mesh with the second pinion gear.

16. The apparatus of claim 15 further comprising a second generally U-shaped housing supporting the second override drive gear.

17. The apparatus of claim 16, further comprising a second support channel, the second drive assembly partially disposed in the second support channel and the second housing supported by the second support channel.

* * * * *